(12) United States Patent
Herzog et al.

(10) Patent No.: US 10,951,147 B2
(45) Date of Patent: Mar. 16, 2021

(54) ACTUATING DEVICE AND VEHICLE STEERING DEVICE COMPRISING AN ELECTRIC ENGINE AND A ROTOR POSITION SENSOR AND A MULTITURN SENSOR

(71) Applicant: ZF Friedrichshafen AG, Friedrichshafen (DE)

(72) Inventors: Stefan Herzog, Salem (DE); Martin Herrmann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/533,181

(22) Filed: Aug. 6, 2019

(65) Prior Publication Data

US 2020/0044591 A1 Feb. 6, 2020

(30) Foreign Application Priority Data

Aug. 6, 2018 (DE) .................. 10 2018 213 112

(51) Int. Cl.
*H02P 21/06* (2016.01)
*B62D 5/00* (2006.01)
*B62D 15/02* (2006.01)
*H02K 7/116* (2006.01)

(52) U.S. Cl.
CPC ............. *H02P 21/06* (2013.01); *B62D 5/001* (2013.01); *B62D 15/02* (2013.01); *H02K 7/116* (2013.01)

(58) Field of Classification Search
CPC .............................. H02P 21/06; H02K 7/116
USPC ................................. 318/799, 798, 767, 727
See application file for complete search history.

(56) References Cited

U.S. PATENT DOCUMENTS

| 7,240,761 | B2* | 7/2007 | Nagase | B62D 5/046 180/443 |
| 8,436,568 | B2* | 5/2013 | Mukai | B62D 5/0481 318/490 |
| 10,284,121 | B2* | 5/2019 | Sun | H02P 23/14 |
| 10,336,365 | B2* | 7/2019 | Fuzes | H02P 25/22 |

FOREIGN PATENT DOCUMENTS

| DE | 10 2004 054 921 A1 | 5/2006 |
| DE | 10 2010 020 599 A1 | 11/2011 |
| DE | 10 2012 008 888 A1 | 10/2013 |

\* cited by examiner

*Primary Examiner* — David Luo
(74) *Attorney, Agent, or Firm* — Brinks Gilson & Lione

(57) ABSTRACT

A regulator may include an output element and an electric motor for driving the output element. The electric motor may have a rotor. A mechanical power transmission device may be located between the rotor of the electric motor and the output element. A rotor position sensor for determining a position of the rotor may be included. A multi-turn sensor may also be included, where the multi-turn sensor is configured to monitor rotation of at least one of the rotor and a rotating element of the mechanical power transmission device.

12 Claims, 1 Drawing Sheet

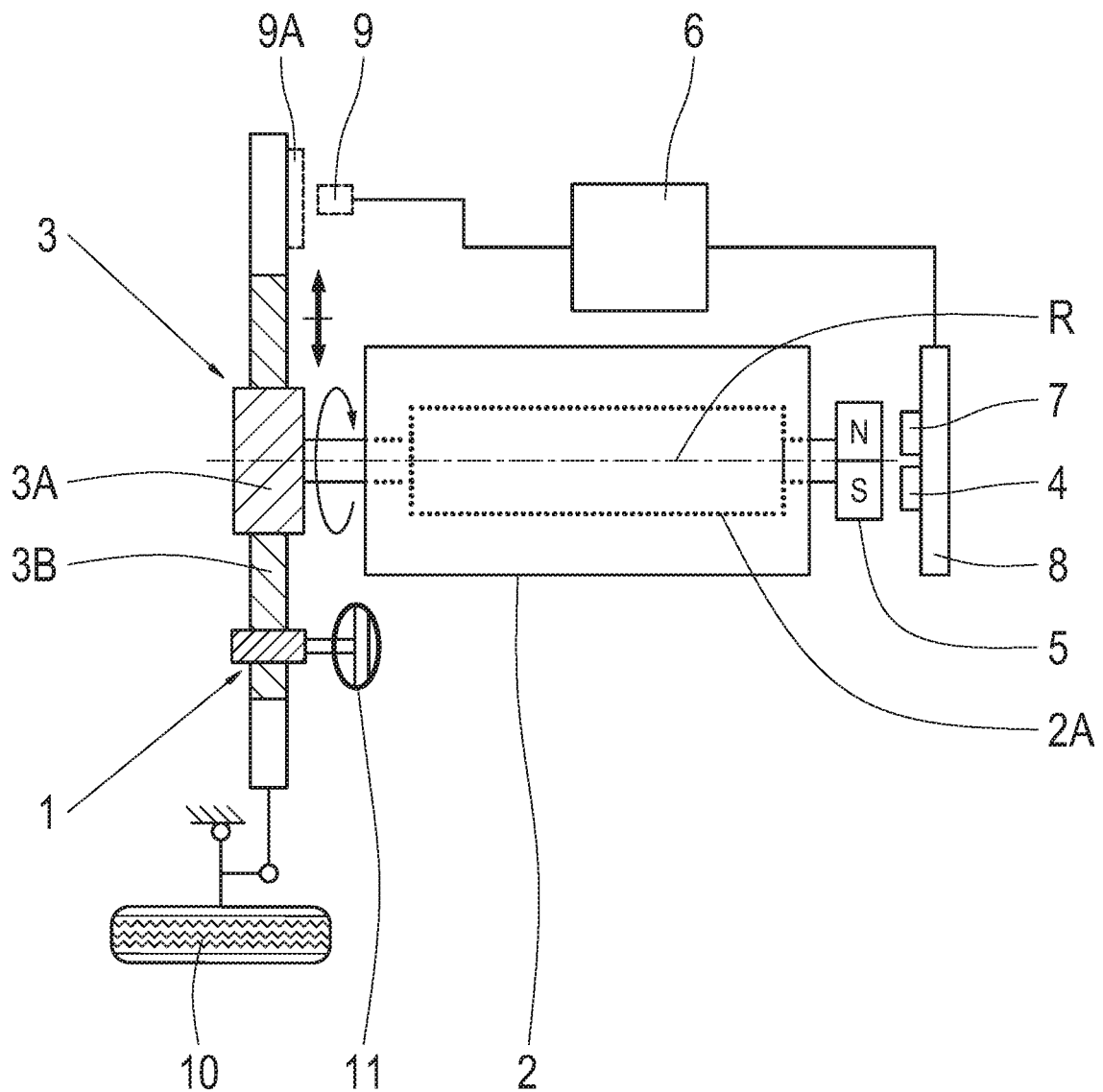

ACTUATING DEVICE AND VEHICLE STEERING DEVICE COMPRISING AN ELECTRIC ENGINE AND A ROTOR POSITION SENSOR AND A MULTITURN SENSOR

RELATED APPLICATIONS

This application claims the benefit and priority of German Patent Application DE 10 2018 213 112.0, filed Aug. 6, 2018, which is incorporated by reference herein in its entirety.

TECHNICAL FIELD

The present disclosure relates to a regulator that has an output element and an electric motor for driving the output element by means of a mechanical gearing between a rotor of the electric motor and the output element. There is a rotor position sensor for determining a rotational position of the rotor. The present disclosure also relates to such a regulator in the form of a motor vehicle steering device.

BACKGROUND

Regulators with an electric motor for driving an output element are well known and in use. Electric motors with rotor position sensors are also known. Depending on the design of the electric motor, a rotor position sensor is necessary, in particular with electrically commutated electric motors, or with electric motors operated by means of space vector modulation.

By way of example, a rotational angle sensor for a motor vehicle steering device with a counter for detecting an absolute rotational angle is known from DE 10 2010 020 599 A1.

A steering assistance device for vehicles that have electromechanical steering is known from DE 10 2004 054 921 A1. This device has a servomotor with a motor position sensor. A position of the rotor in the servomotor is first detected therewith, from which an absolute steering angle and/or a sprocket angle is subsequently determined. As a result, there is no need for a steering angle sensor. The motor position sensor can be a multi-turn sensor.

An energy self-sufficient multi-turn rotary sensor is known from DE 10 2012 008 888 A1.

The object of the invention is to improve on this background.

BRIEF DESCRIPTION OF THE DRAWINGS

The invention shall be explained in greater detail below, in reference to FIG. 1, which shows an embodiment of a regulator, and from which further preferred embodiments and features of the invention can be derived.

DETAILED DESCRIPTION

A regulator and a motor vehicle steering device are proposed.

The proposed regulator has an output element and an electric motor for driving the output element by means of a mechanical power transmission device. The mechanical power transmission device is thus located between the rotor of the electric motor and the output element.

There is also a rotor position sensor for determining the rotor position of the rotor in the electric motor with the proposed regulator. There is also a multi-turn sensor. The multi-turn sensor is configured to count the number of (full) rotations of the rotor or a rotating element in the mechanical power transmission device, e.g. a shaft or a gearwheel in the mechanical power transmission device. Alternatively or additionally, the multi-turn sensor is used for counting the number of incremental rotations of the rotor or the rotating element in the mechanical power transmission device. By way of example, it is used for counting the number of half, quarter, or one eighth rotations (rotational increments) when the respective component (rotor, element) rotates.

The multi-turn sensor is thus configured to detect and count the full rotations or the incremental rotations, or both, when the respective component rotates. The multi-turn sensor takes the direction of rotation of the respective component into account in particular when counting.

In this manner, an absolute position sensor is not needed on the output element. Preferably, there are no further multi-turn sensors, angle sensors, or other rotor position sensors in the regulator.

The rotating element in the mechanic power transmission device is coupled to the rotor for conjoint rotation, in particular. When the rotor turns, it turns with it. The rotating element is located in particular in the power train between the rotor and the output element.

The number of rotations of the respective component (rotor or rotating element in the power transmission device) can also be determined with the multi-turn sensor over numerous full rotations. The absolute position of the output element can thus be easily determined by means of the multi-turn sensor and the rotor position information from the rotor position sensor, when the gear ratio is known. As a result, a separate absolute position sensor is not needed for the output element.

The multi-turn sensor can also be referred to as a rotation counter. In particular, the multi-turn sensor only determines the number of rotations and/or incremental rotations of the respective component. It thus does not determine precise angular information regarding the present rotational angle of the respective component, in contrast to a rotor position sensor, but instead determines a dimensionless number.

The multi-turn sensor retains its counter reading, even with a power failure, in particular (thus without power/self-sufficiently). The multi-turn sensor is configured in particular to detect and count a rotation of the respective component, even with a power failure (thus without power/self-sufficiently). The counter reading is thus up-dated, even when the multi-turn sensor is not supplied with power. the multi-turn sensor thus does not need an external electrical power supply in this case. As a result the absolute position of the output element can still be reliably determined after a power failure, or if the electrical current has been cut off intentionally.

The output element forms the output drive for the regulator. A movement and/or power and/or torque can thus be tapped into for regulating purposes, e.g. in order to move a component or element in a targeted manner. The output element can be a shaft or a rod, for example.

The mechanical power transmission device can be a gearing or a lever mechanism, or a belt drive. The mechanical transmission generated therewith can have a fast (i<1) or slow (i>1) gear ratio. The mechanical power transmission device is preferably configured to convert a rotational movement of the rotor into a translational movement of the output element. The output element can thus be moved in a purely translational manner by the electric motor.

The rotor position sensor is configured in particular as a single-turn sensor. The rotor position can thus only be determined within a full rotation of the rotor (360°) or within a rotational increment (half, quarter, eight rotation), but not over numerous rotations of the rotor. If the rotor position sensor can also determine the position of the rotor within an increment of a rotation, the multi-turn sensor is preferably configured to count such incremental rotations. The rotor position sensor is used in particular for detecting relative angles of the rotor. The rotor position sensor is used in particular for actuating the electric motor. The electric motor is configured to run in particular by means of an electrical commutation or by means of space vector modulation, wherein the rotor position sensor generates the position information for the rotor used for this.

There is preferably a single transmitter element for both the rotor position sensor and the multi-turn sensor. A separate second transmitter is therefore not provided for the rotor position sensor or the multi-turn sensor. As a result, the entire sensor assembly can be kept small. It can thus be easily integrated in the electric motor.

The rotor position sensor and the multi-turn sensor can form a combined sensor module. In particular, the rotor position sensor and the multi-turn sensor can be placed on the same circuit board or baseplate, in particular adjacently. They thus form a single component, and can be installed collectively.

The rotor position sensor and the multi-turn sensor are preferably formed on the same semiconductor chip. For this, the two sensors can be formed as structures on the same semiconductor chip. They thus form an integrated component of the semiconductor chip.

The transmitter element is preferably a permanent magnet. The transmitter element is a dipole or quadripole magnet, in particular. Known rotor position sensors and multi-turn sensors can thus be used.

The multi-turn sensor is preferably a Wiegand sensor (in particular a Wiegand wire for counting magnetism reversal pulses) or a GMR sensor with a domain wall generator and a spiral thin layer structure. Such a GMR sensor is based on the giant magnetoresistance effect.

The rotor position sensor can be an inductive sensor. In this case, there is an additional transmitter magnet for the multi-turn sensor, as long as it is a Wiegand or GMR sensor, in the form of a second transmitter magnet. The two transmitter elements, i.e. the transmitter element for the rotor position sensor and the transmitter element for the multi-turn sensor, can both be attached to the motor shaft of the electric motor.

As stated above, because a multi-turn sensor is used, there is no need for an absolute sensor and transmitter for the output element. Accordingly, the output element itself preferably does not have a position sensor. There is therefore no position sensor in the region of the output element directly providing position information regarding the absolute position of the output element. In this manner, the number of necessary interfaces and the costs for the regulator can also be reduced.

The absolute position of the output element can preferably be determined on the basis of the counter reading for the multi-turn sensor combined with the current rotor position information from the rotor position sensor and the known gear ratio of the power transmission device.

The position information from the rotor position sensor can be used to check the plausibility of the multi-turn sensor. For this, the completed rotations of the rotor can also be counted based on the position information output by the rotor position sensor, and compared with the counter reading of the multi-turn sensor. If differences are detected, it can be assumed that there is an error in the multi-turn sensor or the rotor position sensor.

The actual determination of the position of the output element and/or the rotor based on the information provided by the sensors can take place in a control device. This control device can also be configured to actuate the electric motor. The control device can be part of the regulator.

The proposed power transmission device has a steering rod for the output element. This is used for generating a steering movement in at least one vehicle wheel that can be steered. The steering rod is thus mechanically coupled to the vehicle wheel when the steering device is installed, such that it can move the wheel accordingly as needed. The motor vehicle steering device forms the proposed regulator in this case. In other words, the motor vehicle steering device contains the steering rod as the output element, as well as the electric motor for driving the steering rod by means of the mechanical power transmission device between the rotor of the electric motor and the steering rod, and also the rotor position sensor and the additional multi-turn sensor.

The power transmission device can form a mechanical connection between the output element (steering rod) and a steering wheel that allows a user to initiate the steering movement. This is a motor vehicle steering device for a front axle in this case. Alternatively, the motor vehicle steering device does not have any mechanical connections between the output element (steering rod) and such a steering wheel. In this case, it forms a motor vehicle steering device for a rear axle.

It should be noted that the proposed regulator does not have to be used for a motor vehicle steering device. It can also be used, for example, for executing other regulating tasks in a motor vehicle or some other type of vehicle, or it can be used in entirely different application fields, e.g. for executing regulating tasks in manufacturing or processing.

FIG. 1 shows a schematic illustration of a regulator that has an output element 1 and an electric motor 2 for driving the output element 1. A mechanical power transmission device 3 is located between the output element 1 and the rotor 2A of the electric motor 2. This is configured as a rack gearing, for example, i.e. the rotor 2A is connected to a gearwheel for conjoint rotation, which meshes with the teeth in a rack segment 3B of the output element 1. A threaded spindle or other type of mechanical power transmission device can also be used. A rotation of the rotor 2A is converted to a translational movement of the output element 1 by means of the mechanical power transmission device 3. These movements are indicated in FIG. 1 by corresponding arrows. A rotational axis of the rotor 2A is indicated by the letter "R." In an alternative embodiment, the output element 1 can also be rotated.

A rotor position sensor 4 in the form of a single-turn sensor is provided for determining the rotor position of the rotor 2A, in particular for an electrical commutation or space vector modulation of the electric motor 2. This is dedicated to a transmitter element 5 coupled to the rotor 2A for conjoint rotation. The transmitter element 5 rotates in the opposite direction of the rotor position sensor 4, thus together with the rotor 2A. The transmitter element 5 is formed by a dipole permanent magnet in the present case. The rotor position sensor 4 generates position information for the rotor 2A based on the respective current position of the transmitter element 5 within a full rotation of the rotor 2A or within an incremental rotation. This position information is conveyed to a control device 6 by the rotor position sensor 4. The control device 6 is configured to determine the rotor position (in particular the rotational angle) within the full or half rotation of the rotor 2A.

In order to also determine the rotor position of the rotor 2A over numerous rotations of the rotor 2A, there is also a multi-turn sensor 7 in addition to the rotor position sensor 4. The rotor position sensor 4 and the multi-turn sensor 7 preferably both use the transmitter element 5 for generating the respective position information. Alternatively, the multi-turn sensor 7 has its own (second) transmitter element.

The multi-turn sensor 7 counts the number of rotations and/or incremental rotations of the rotor 2A based on the respective current position of the transmitter element 5. The multi-turn sensor 7 also retains its counter reading without power in a power failure, and continues to count the rotations and/or incremental rotations of the rotor 2A. Its reading is conveyed by the multi-turn sensor 7 to the control device 6, or the control device 6 can retrieve the counter reading from the multi-turn sensor 7.

The control device 6 can determine the rotor position via the rotations of the rotor 2A therewith. Both rotational directions of the rotor 2A are taken into account. Furthermore, the mechanical gearing ratio of the mechanical transmission 3 is stored in the control device 6. The control device 6 is thus able to, and is configured to determine the absolute position of the output element 1 by means of this gearing ratio and by means of the counter reading provided by the multi-turn sensor 7, and the position information generated by the rotor position sensor 4.

As can be seen in FIG. 1, the sensors 4, 7 can be adjacent to one another, preferably on a circuit board 8 or a baseplate, and preferably directly adjacent to one another. The sensors 4, 7 can thus be combined to form a sensor module. The sensors 4, 7 can also be formed on the same semiconductor chip. The sensors 4, 7, or the sensor module can be integrated in the electric motor 2.

The absolute position of the output element 1 has conventionally been determined by means of a separate position sensor 9 for the output element 1. This requires a separate transmitter element 9A on the output element 1, however. With the multi-turn sensor 7 and the transmitter element 5 used together with the position sensor 4, these elements 9, 9A are unnecessary. The output element 1 itself thus does not need these elements 9, 9A.

The regulator shown in FIG. 1 can be used in theory for numerous regulating tasks. In one embodiment of the regulator, it forms a motor vehicle steering device. This embodiment is indicated by way of example at the bottom of FIG. 1. In this case, the output element 1 forms a steering rod for the steering device. The output element 1 is mechanically connected to a vehicle wheel 10 for generating a steering movement as needed. Moreover, there can also be an optional mechanical connection to a steering wheel 11, by means of which a user can initiate a steering movement. This mechanical connection is unnecessary, however, e.g. when the motor vehicle steering device is designed for a rear axle.

REFERENCE SYMBOLS 1 output element, steering rod
2 electric motor
2A rotor
3 mechanical power transmission device
3A gearwheel
3B rack segment
4 rotor position sensor
5 transmitter element
6 control device
7 multi-turn sensor
8 circuit board, baseplate
9 position sensor
9A transmitter element
10 vehicle wheel
11 steering wheel
R rotational axis

We claim:

1. A motor vehicle steering device, comprising:
a regulator, the regulator comprising:
an output element;
an electric motor for driving the output element, the electric motor having a rotor;
a mechanical power transmission device between the rotor of the electric motor and the output element;
a rotor position sensor for determining a position of the rotor; and
a multi-turn sensor configured to monitor rotation of the rotor,
wherein the motor vehicle steering device comprises a steering rod,
wherein the steering rod forms the output element of the regulator for generating a steering movement of at least one vehicle wheel, and
wherein the motor vehicle steering device lacks a mechanical connection between the output element and a steering wheel.

2. The motor vehicle steering device according to claim 1, wherein each of the rotor position sensor and the multi-turn sensor share a transmitter element.

3. The motor vehicle steering device according to claim 2, wherein the transmitter element is a permanent magnet.

4. The motor vehicle steering device according to claim 1, wherein the multi-turn sensor and the rotor position sensor form a sensor module.

5. The motor vehicle steering device according to claim 1, wherein the multi-turn sensor and the rotor position sensor are formed on the same semiconductor chip.

6. The motor vehicle steering device according to claim 1, wherein the output element does not have a position sensor.

7. A motor vehicle steering device, comprising:
a regulator, the regulator comprising:
an output element;
an electric motor for driving the output element, the electric motor having a rotor;
a mechanical power transmission device between the rotor of the electric motor and the output element;
a rotor position sensor for determining a position of the rotor; and
a multi-turn sensor configured to monitor rotation of a rotating element of the mechanical power transmission device,
wherein the motor vehicle steering device comprises a steering rod,
wherein the steering rod forms the output element of the regulator for generating a steering movement of at least one vehicle wheel, and
wherein the motor vehicle steering device lacks a mechanical connection between the output element and a steering wheel.

8. The motor vehicle steering device according to claim 7, wherein each of the rotor position sensor and the multi-turn sensor share a transmitter element.

9. The motor vehicle steering device according to claim 8, wherein the transmitter element is a permanent magnet.

10. The motor vehicle steering device according to claim 7, wherein the multi-turn sensor and the rotor position sensor form a sensor module.

11. The motor vehicle steering device according to claim 7, wherein the multi-turn sensor and the rotor position sensor are formed on the same semiconductor chip.

12. The motor vehicle steering device according to claim 7, wherein the output element does not have a position sensor.

\* \* \* \* \*